Nov. 1, 1949.　　　　　G. E. HOCKENS　　　　　2,486,598
APPARATUS FOR LOW TEMPERATURE GAS COMPRESSION
Filed Dec. 13, 1947　　　　　　　　　　　　　　　4 Sheets-Sheet 3

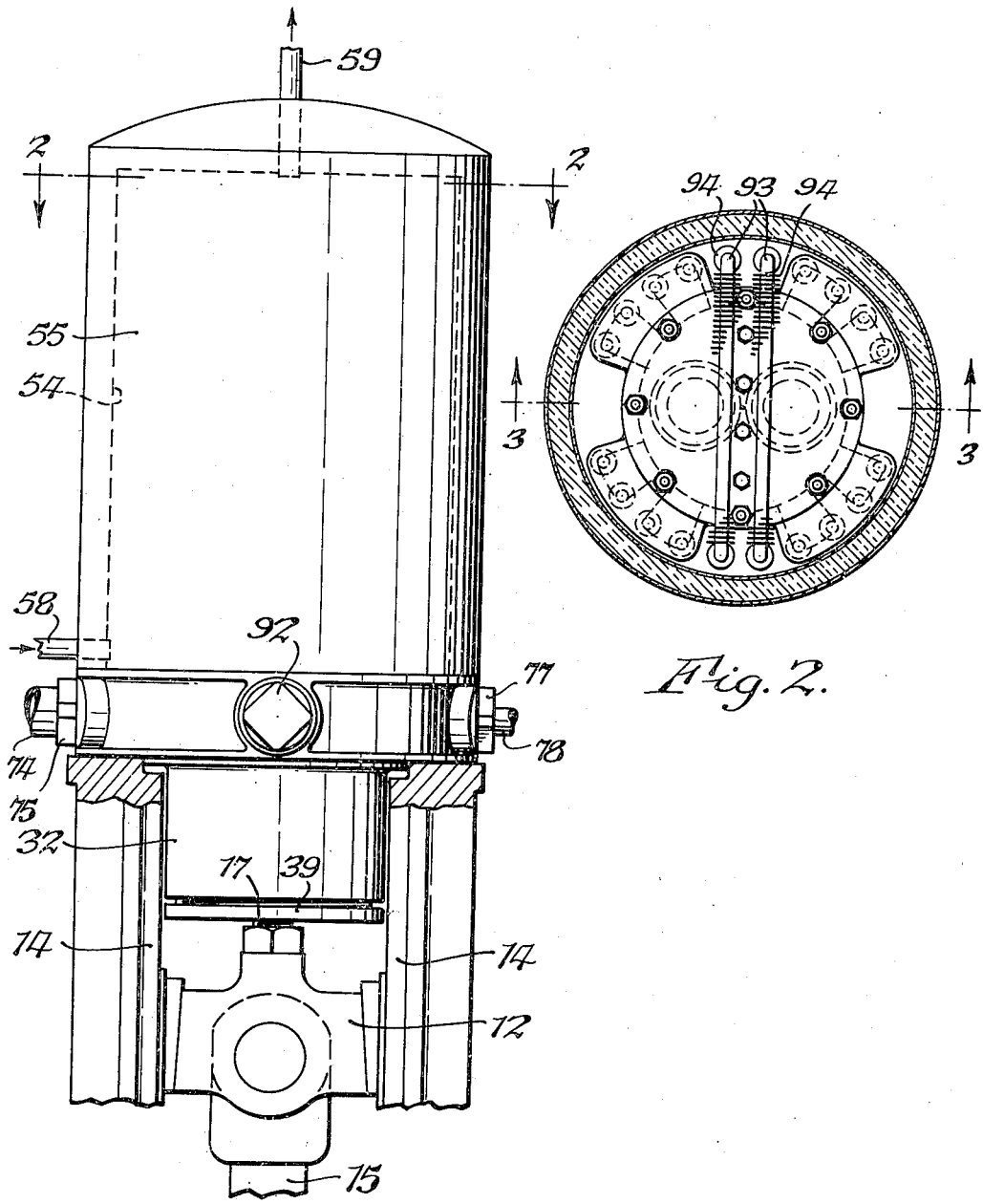

INVENTOR.
Grant E. Hockens,
BY Parker, Birchmon Harmon,
Attorneys.

Nov. 1, 1949.  G. E. HOCKENS  2,486,598
APPARATUS FOR LOW TEMPERATURE GAS COMPRESSION
Filed Dec. 13, 1947  4 Sheets-Sheet 4

INVENTOR.
Grant E. Hockens
BY
Parker, Prochnow & Farmer,
Attorneys.

Patented Nov. 1, 1949

2,486,598

UNITED STATES PATENT OFFICE 2,486,598

APPARATUS FOR LOW TEMPERATURE GAS COMPRESSION

Grant E. Hockens, East Aurora, N. Y., assignor to The Wittemann Company, Inc., Buffalo, N. Y.

Application December 13, 1947, Serial No. 791,594

4 Claims. (Cl. 230—211)

This invention relates to improvements in gas compressors. More particularly this invention relates to apparatus for use in connection with the compression of carbon dioxide formed during fermentation in the manufacture of certain types of beverages.

It is well known that carbon dioxide gas formed during the process of fermentation in the making of beverages contains certain volatiles, such as esters, which impart desirable flavors and aromas to beverages such as beers and ales when such gas is used in connection with the handling or carbonating of the beverages, and it is also well known that such volatiles or esters are readily altered when heated to temperatures in the neighborhood of 100 degrees F., so that the desirable flavors and aromas are destroyed. In order to efficiently store such fermentation gases, it is necessary to compress them to high pressures or to liquefy them. If ordinary gas compressors are used for this purpose, the gas is raised to temperatures far in excess to those at which the volatiles will be altered, and furthermore in ordinary compressors, lubricants such as commonly used to form an oil film between the piston and the cylinder wall will become mixed with the fermentation gas so as to render the same objectionable for use in connection with the treatment or handling of beverages, since even small quantities of oil will adversely affect the taste and foaming properties of the beverage. Water has been added to the fermentation gases and injected into the compressors for cooling the gases during compression, but this method of compressing such gases has a number of objections, including the difficulty of maintaining a supply of the correct amount of cold water to the compressor and then separating the water from the compressed gas.

One of the objects of this invention is to provide an improved apparatus for compressing fermentation gas without altering the volatiles which impart flavor and aroma to the gas. Another object of this invention is to provide an apparatus of this type in which the gas may be compressed while dry and without the presence of water or liquid lubricant in the compressor in contact with the gas. It is also an object of this invention to provide a compressor, the cylinder of which is enclosed in a housing which forms the evaporator of a refrigerating system.

Another object of this invention is to provide a compressor with a housing surrounding the cylinder and containing a readily volatile refrigerant and in which passages for the fermentation gas leading to and from the cylinder are provided in which this gas is cooled while passing to and from the compressor. A further object is to provide a multi-stage compressor having its housing enclosed in an evaporator of a refrigerating system and having passages within the enclosure exposed to the action of said refrigerant through which the fermentation gas passes before compression, and between the compression stages, and by means of which refrigerant the compressor itself is cooled to such an extent that the fermentation gas at no time is raised to a temperature at which the volatiles therein are altered. A further object is to provide a compressor having a piston of improved construction which has a removable head and on which piston rings of carbon or other composition which do not require lubrication may be used. Other objects and advantages of this invention will appear from the following description and claims.

In the accompanying drawings:

Fig. 1 is a fragmentary elevation, partly in section, of a compressor embodying this invention.

Fig. 2 is a transverse sectional plan view thereof on line 2—2, Fig. 1.

Figure 3:
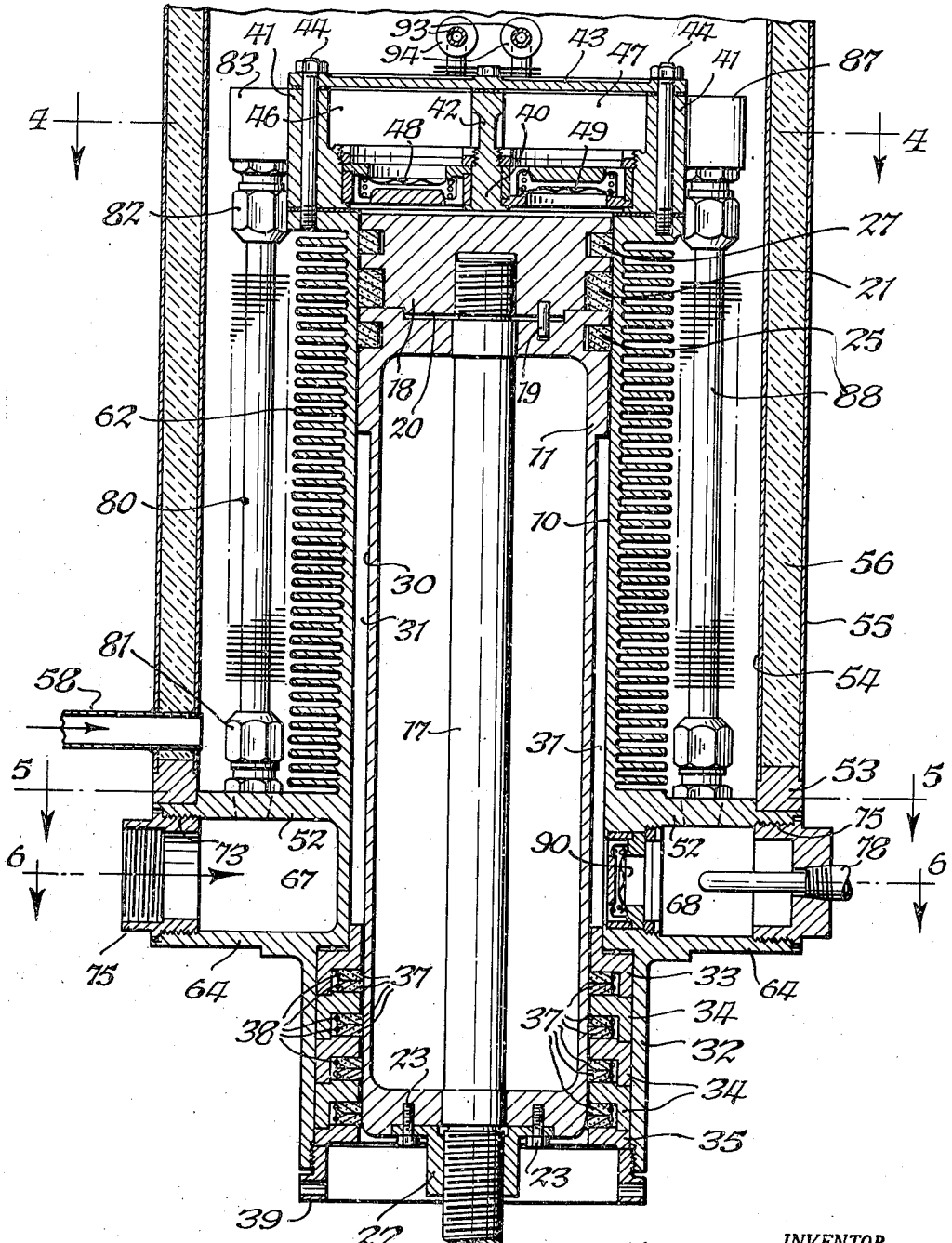
Fig. 3 is a fragmentary central sectional elevation thereof.
Figure 4:
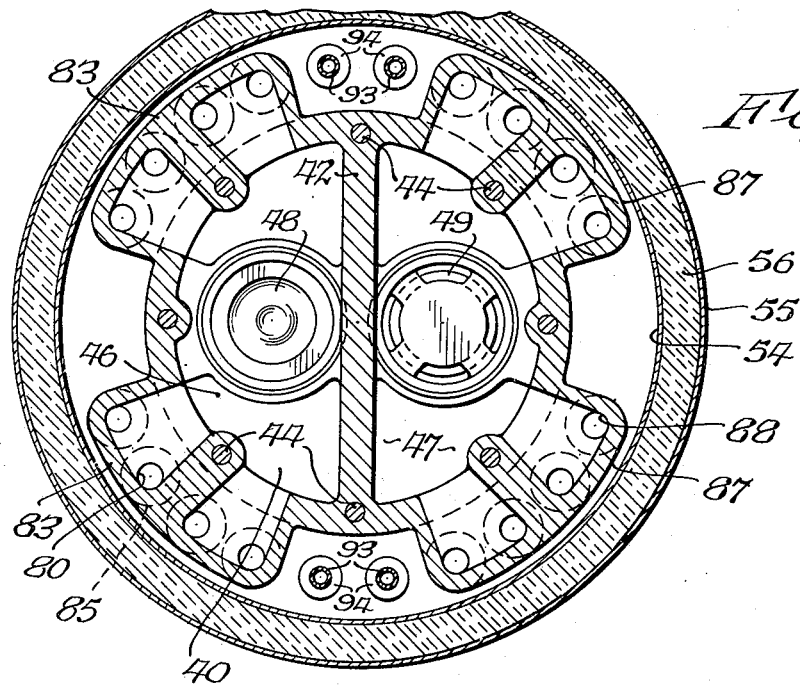
Figure 5:
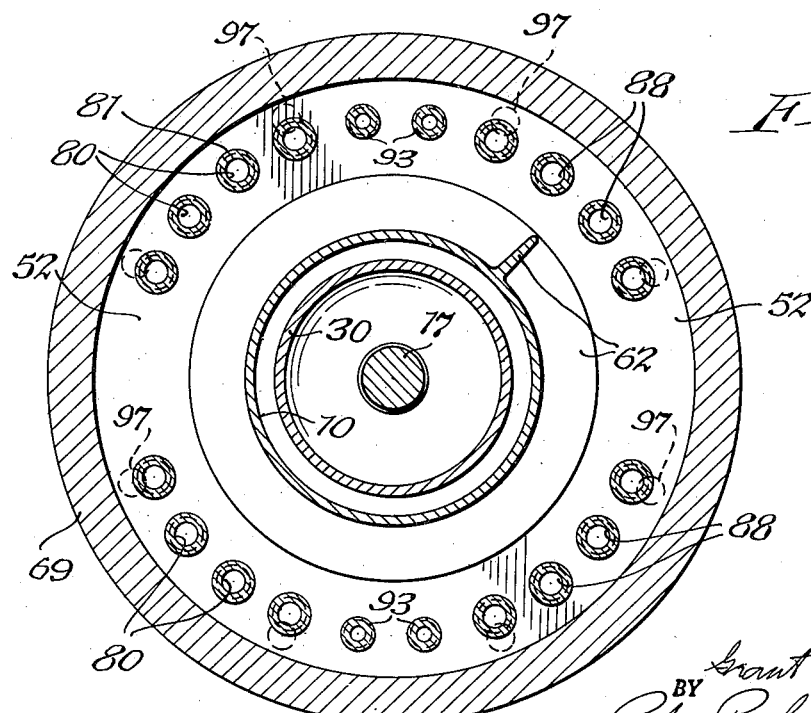
Figure 6:
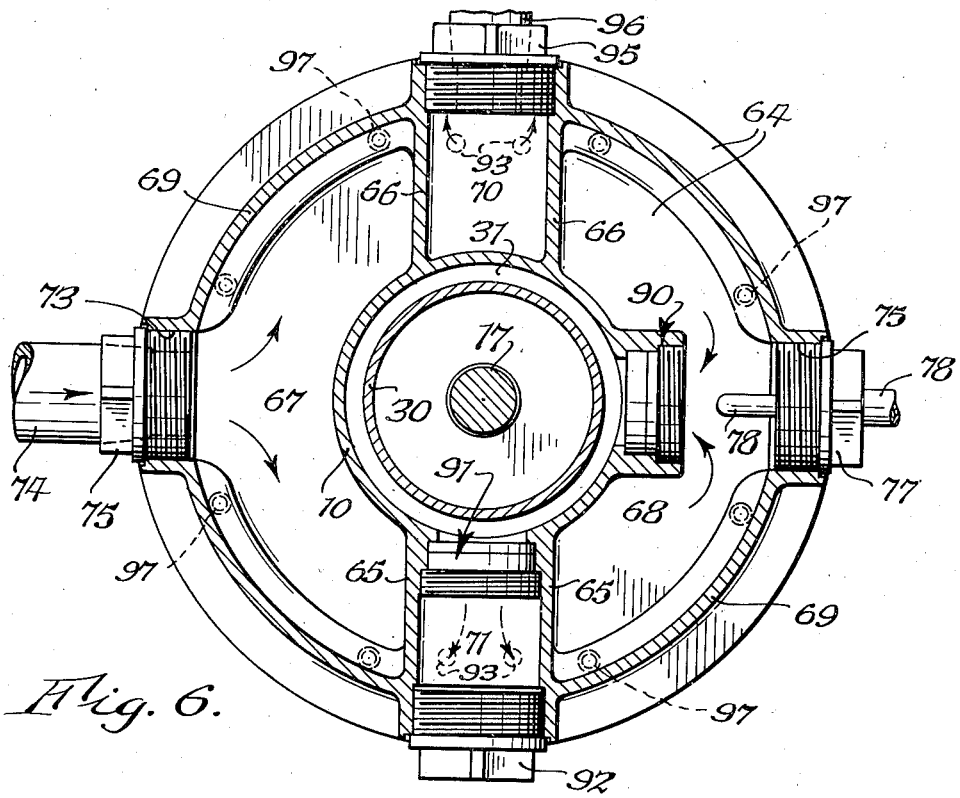

Figs. 4, 5 and 6 respectively are sectional plan views thereof on lines 4—4, 5—5 and 6—6 respectively, Fig. 3.

Figure 7:
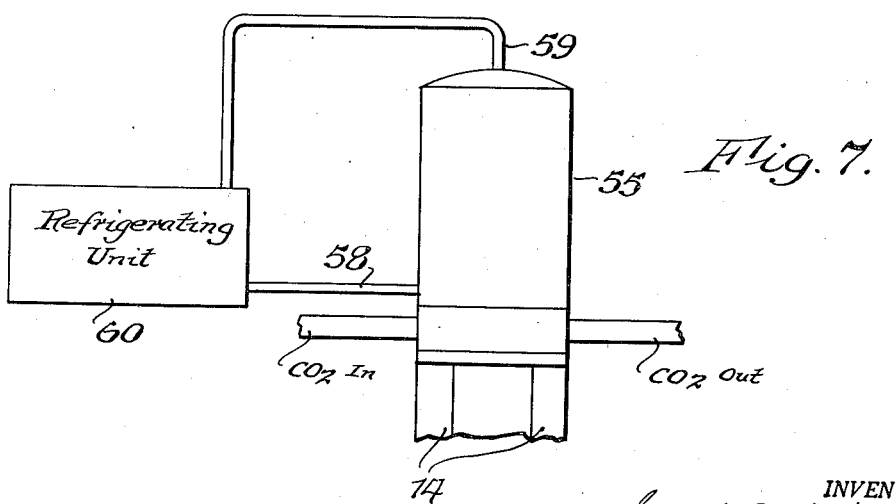

Fig. 7 is a diagrammatic view showing my improved apparatus embodying this invention.

My improved process may be carried out by means of a gas compressor of any suitable or desired type, such as rotary or reciprocatory. In the accompanying drawings I have shown, by way of example, my invention applied to a reciprocating compressor having a cylinder 10 within which a piston 11 is mounted to reciprocate. Since compressors of this type are well known, I have not deemed it necessary here to show the entire mechanism employed for imparting reciprocation to the piston. In Fig. 1 I have, however, illustrated a cross head 12 mounted to reciprocate in guides 14 and connected with a connecting rod or pitman 15, the lower end of which cooperates with a crank shaft (not shown).

In compressors of this type as heretofore constructed, a liquid lubricant such as water or oil has been used to lubricate the piston rings. In order to avoid the use of any liquid lubricants, I have provided a piston which is constructed to be used in connection with piston rings made of carbon or of a plastic material capable of operating without such liquid lubricants. For this purpose the piston 11 is preferably constructed to receive a solid or one piece guide ring as hereinafter described.

The piston 11 consequently is preferably of hollow, substantially cylindrical form and has a removable head 18 which is rigidly secured thereto, for example by means of a piston rod or shaft 17 extending axially through the piston and having its upper end threaded and engaging in a threaded hole in the head 18. The piston head fits tightly against the upper end of the piston 11 and is held in axial alinement therewith in any suitable manner, for example by means of interfitting annular parts as shown in Fig. 3, including a downwardly extending projection 20 fitting into a corresponding depression in the upper end of the piston, and the head is suitably held against rotation relatively to the piston, for example by means of a pin 19. The bottom of the piston head is provided at its periphery with a portion of reduced diameter which together with the upper end of the piston forms a groove in which a guide ring 21 fits snugly. This guide ring is of solid or one piece construction, not being split or formed in segments, and is consequently fitted into the reduced lower portion of the piston head before the piston head is secured to the piston. The piston head may then be secured to the piston by means of the piston rod 17, the lower portion of which is also screw threaded and engages a correspondingly threaded flanged sleeve 22 which is secured to the lower end of the piston in any suitable manner, for example by means of bolts 23 extending through holes in the flange of the sleeve 22 and into threaded holes in the lower end of the piston. The piston rod or pin 17 is first threaded into the threaded hole in the piston head and the head is then drawn tightly against the upper end of the piston by turning the sleeve 22 until sufficient tension is applied to the piston rod 17 to tightly draw the head 18 against the upper end of the piston. The portion of the piston rod below the nut 23 may be suitably secured in any desired manner to the cross head 12.

Additional piston rings are employed for forming a seal between the piston and the walls of the cylinder 10. Any desired number of piston rings may be employed, and in the construction illustrated by way of example, I have provided a piston ring 25 arranged in a groove formed in the upper portion of the piston, and another piston ring 27 arranged in a groove formed in the head 18 of the piston. The piston rings 25 and 27 are formed in segments and suitable means, not shown, are employed in the piston grooves to urge the piston rings 25 and 27 outwardly into engagement with the cylinder.

The compressor shown is of the two-stage type, and for this purpose the piston 11 is provided with a portion 30 of smaller diameter than the upper end thereof, thus forming with the cylinder 10 a space 31 in which the second stage of compression is effected. In order to seal this space, the cylinder is provided with a downwardly extending skirt portion 32 in which is arranged a plurality of annular members 33, 34 and 35 of angle shaped cross section which are formed to interfit in such a manner as to provide grooves for a plurality of piston rings 37. These rings are urged inwardly toward the wall of the piston 11 by suitable spring members 38 of any desired construction. 39 represents a collar having a screw threaded engagement with the lower end of the skirt 32 for pressing the annular members into contact with each other. The piston rings 37 are also formed of carbon or other material which does not require a lubricant. A piston of any other suitable or desired construction may be employed.

The cylinder 10 has a head which is tightly secured thereto. This cylinder head in the construction shown by way of example comprises a substantially disc-like body portion 40 adapted to fit against the upper end of the cylinder 10 and having an annular flange 41 extending upwardly from the peripheral portion of the body 40 of the head. The cylinder head also has a transversely or diametrically extending wall 42 which is preferably formed integral with the portion 40 and flange 41 of the piston head, and which divides the space within the flange into two compartments. 43 represents a disc or circular plate, the edges of which are secured to the upper edge of the flange 41 and which also has a sealed connection with the upright diametric wall 42 of the cylinder head. This cover or disc 43 may be secured in place on the cylinder head by means of bolts 44 which also serve to secure the cylinder head to the upper end of the cylinder.

The construction described forms two separate spaces or compartments 46 and 47 within the cylinder head, the space 46 being connected with the interior of the cylinder by means of a low pressure or suction valve 48 suitably mounted in the cylinder head to open when the piston 11 produces suction within the cylinder 10. The other space 47 in the cylinder head is connected with the cylinder by means of a low pressure discharge valve 49 through which the gas passes after the first stage of compression. A cylinder head and valve arrangement of any other suitable or desired type may be provided.

Suitable means are provided for enclosing the cylinder in a housing forming a container or dome forming an evaporator for a volatile liquid refrigerant which is vaporized by heat from the cylinder 10 and other parts of the compressor, and by heat transmitted thereto from the fermentation gas. In the construction shown for this purpose, the cylinder 10 is provided with a radially outwardly extending wall or flange 52 and a suitable housing or dome is secured to the peripheral portion of the flange 52. This housing or dome may be of any suitable or desired construction, and as illustrated includes a ring 53 formed to seat tightly on the flange 52. This ring has an inner wall 54 of the dome or housing secured thereto and an outer housing wall or dome 55 also secured to the ring in spaced relation to the inner wall 54. The space between the two walls is filled with suitable heat insulating material 56. The housing or dome, consequently, encloses the entire cylinder and all of the parts attached thereto above the flange 52. This dome forms an air-tight closure about the cylinder and is provided near the lower portion thereof with an inlet tube 58 for liquid refrigerant, and in the upper portion thereof, the dome is provided with a discharge tube 59 for volatilized refrigerant. As shown in Fig. 7, the pipes 58 and 59 are connected to a suitable refrigerating unit 60 which includes a compressor and other instrumentalities (not shown), for liquefying vaporized refrigerant entering the refrigerating unit through the passage 59. Any suitable refrigerant may be employed, and the refrigerating unit 60 may be a large refrigerating machine or ammonia compressor which also supplies liquid ammonia to other apparatus or evaporating coils, or it may be a separate unit supplying only the evaporator enclosing the cylinder 10. The refrigerant may be selected to maintain any desired low temperature about the cylinder 10, and to facilitate the transfer of heat from the interior of the cylinder 10 to the refrigerant surrounding the cylinder, the walls of the cylinder may be provided with radiating fins 62 of any desired type, those shown being integrally formed with the cylinder 10. These fins may, if desired, be of spiral form so that any gas bubbles formed between the fins resulting from evaporation of the refrigerant, will tend to flow upwardly along the spiral fins and be discharged therefrom for return to the refrigerating unit through the pipe 59.

The lower end of the cylinder 10 is provided below the flange 52 with another flange 64. The space between the two flanges is divided by means of two pairs of upright spaced walls 65 and 66 into two main compartments or chambers 67 and 68, these chambers being enclosed by a peripheral annular upright wall 69, Fig. 6. The spaces between the pairs of upright walls 65 and 66 form passages or smaller chambers 70 and 71.

The peripheral wall 69 about the chamber 67 is provided at one side thereof with a threaded opening 73 to which an inlet pipe 74 for gas to be compressed is connected by means of a coupling sleeve 75. At the other side of the peripheral wall 69 a similar threaded opening 75 is provided which leads into the chamber 68 and into which a threaded plug 77 fits, and this plug closes the threaded opening 75 and may support a temperature responsive member 78, by means of which the temperature of the gas in the chamber 68 may be determined.

The chamber 67 at the lower part of the cylinder of the compressor is connected with the low pressure suction chamber or space 46 in the cylinder head by means of a series of tubes or conduits which are arranged in the space between the inner wall 54 of the insulating dome and the cylinder 10. In the particular construction illustrated in Figs. 3 and 5, a plurality of tubes 80 is shown for this purpose, the lower ends of these tubes being suitably connected with the passage 67 by suitable coupling means 81. The upper ends of the tubes 80 are connected by similar coupling means 82 with a series of outwardly extending hollow projections 83 of the cylinder head. These projections 83 which are best shown in Figs. 3 and 4 form continuations of the chamber 46 and are provided with apertures in the lower walls thereof which are threaded to cooperate with the coupling members 82. The tubes 80 are made of a metal having good heat conductivity and are preferably provided on their outer surfaces with heat radiating fins 85. Eight of these tubes 80 are shown in the construction illustrated, but it will be obvious that any desired number of tubes of this type may be provided. Consequently, the fermentation gases to be compressed enter from the tube 74 into the lower chamber 67, see Figs. 3 and 6, and pass upwardly through the heat exchange tubes 80 into the low pressure or suction chamber 46 in the cylinder head. During this passage of the gas through these tubes, the outer surfaces of which are exposed to the refrigerant, the gas is received in the chamber 46 of the cylinder head at a low temperature, and then passes through the suction or inlet valve 48 into the upper portion of the cylinder 10 during the downward movement of the piston 11. Upon the return or upward stroke of this piston, the gas is compressed and discharged through the valve 49 into the cylinder head chamber 47. This chamber is provided with hollow lateral projections 87, which may be similar in construction to the projections 83 which connect with the chamber 46. These projections of the cylinder head are connected by means of heat exchange tubes 88, which may be similar in construction to the tubes 80, with the lower chamber 68. The gas is, of course, heated during the compression in the upper part of the cylinder 10 and by passing through the heat exchange tubes 88 which are immersed in the refrigerant, the temperature of this gas is again lowered so that the same is ready to enter into the second stage of compression.

The lower chamber 68 is connected with the lower portion of the cylinder 10 by means of an inlet or suction valve 90 which is arranged between the chamber 68 with the space 31 between the piston 11 and the wall of the cylinder 10. Consequently, during the up stroke of the piston 11, gas which has been compressed in the upper part of the cylinder is admitted through the valve 90 into the space 31, and upon the down stroke of the piston this compressed gas passes through a discharge valve 91, Fig. 6, into the passage 71 formed between the upright walls 66. The outer end of this passage is closed by means of a plug 92.

The passage 71 is connected by means of one or more heat exchange tubes 93, two such tubes being shown in the construction illustrated. These tubes are of inverted U-shape and are preferably also provided with heat radiating fins 94. These tubes are connected to receive compressed gas from the chamber 71, and these tubes extend along one side of the cylinder 10, then over the top of the cylinder head and there down along the other side of the cylinder. The compressed gas from these tubes is discharged into the chamber 70. This chamber has a threaded opening in which is arranged a suitable pipe coupling member 95 connected to a discharge pipe 96 through which the compressed gas is discharged after having been chilled to a low temperature by passing through the tubes 93 from the chamber 71 to the chamber 70.

By means of the construction described, the fermentation gas can readily be kept below the temperature at which the aroma or flavor imparting ingredients of the gas are destroyed. The gas is not only chilled while passing through the heat exchange tubes 80, 88 and 93, but also while in the cylinder since the refrigerant surrounding the cylinder keeps the walls of the cylinder at low temperatures. The refrigerant also chills the larger chambers 67 and 68 by being in contact with the flange 52 which forms the upper wall of these chambers. The smaller chambers or passages 70 and 71 are also chilled in a similar manner. The construction described has the advantage that the cooling pipes 80, 88 and 93 are completely surrounded by refrigerant and the fins secured to these tubes add greatly in dissipating heat from the tubes into the refrigerant. By means of the heat responsive device 78, the temperature of the gas can be observed and the refrigerating compressor regulated so as to maintain the necessary low temperatures of the gas. 97, Fig. 5, represents bolts connecting the lower flange 64 of the cylinder with the upper ends of the guides 14 for the crosshead 12.

By the use of a volatile liquid refrigerant about the housing or cylinder of the compressor and about the tubes which conduct the fermentation gas to and from the compressor, much lower temperatures of the fermentation gas and the compressor can be obtained, since the liquid refrigerant becomes gasified or vaporized by heat given off by the fermentation gas through the tubes and cylinder housing walls, which vapor moves rapidly out of contact with the surfaces to be cooled and flows to the top of the dome, from which it is withdrawn by the refrigerator unit. Consequently the surfaces to be cooled are substantially continuously in contact with low pressure liquid refrigerant, so that very efficient and rapid cooling of these surfaces results, whereby a rise in temperature such as will change the volatiles in the fermentation gas can be readily prevented.

By using rings which require no liquid lubricant, the fermentation gases are in no way adversely affected by the compression of the same and the gas may consequently be compressed while dry.

Various changes in the details, materials and arrangements of parts, which have been herein described and illustrated in order to explain the nature of the invention, may be made by those skilled in the art within the principle and scope of the invention, as expressed in the appended claims.

I claim as my invention:

1. Apparatus for low temperature compression of fermentation gas, including a cylinder in which the gas may be compressed, a cylinder head forming a compartment for gas to be compressed and a compartment for compressed gas, said cylinder head having lateral extensions which project beyond the side walls of the cylinder and which are hollow and form lateral extensions of said compartments, a pair of annular flanges extending radially from the lower portion of said cylinder and integrally connected at their outer ends with a peripheral wall to form an enclosed space between said flanges, upright walls dividing said space between said flanges into a plurality of compartments, a plurality of tubes each connecting a compartment located between said flanges with a compartment of said cylinder head, an evaporator extending about said cylinder and said tubes, a refrigeration unit for supplying liquid refrigerant to said evaporator and for withdrawing refrigerant vapors from said evaporator, a conduit for admitting gas to be compressed to one of said compartments between said flanges, and a conduit connecting with another of said compartments between said flanges for the discharge of compressed fermentation gas from said apparatus, whereby incoming fermentation gas passes upwardly through tubes in heat exchange relation to said refrigerant from a compartment between said flanges to said cylinder head, and compressed gas passes downwardly from said cylinder head to another of said compartments arranged between said flanges.

2. Apparatus for low temperature compression of fermentation gas, including a cylinder in which the gas may be compressed, a cylinder head forming a compartment for gas to be compressed and a compartment for compressed gas, said cylinder head having lateral extensions which project beyond the side walls of the cylinder and which are hollow and have the spaces enclosed thereby connected with said compartments, a hollow annular outwardly extending part formed integral with the lower portion of said cylinder and extending about the same, upright walls in said hollow projection for dividing the space within said projection into separate compartments, an evaporator extending about said cylinder and having the lower end thereof secured to said annular projection, a tube for conducting gas from a compartment of said lower projection into said compartment in said cylinder head for gas to be compressed and extending through said evaporator, another tube connecting the other compartment of said cylinder head with another compartment of said annular projection, and extending through said evaporator, for conducting compressed gas from said cylinder head to said annular projection, said tubes being connected at the upper ends to the extensions of said cylinder head, and a refrigeration unit for supplying liquid refrigerant to said evaporator and for withdrawing vaporized refrigerant from the upper portion of said evaporator.

3. Apparatus for low temperature compression of fermentation gas, including a cylinder in which the gas may be compressed, a cylinder head having a compartment therein for gas to be compressed and a compartment for compressed gas, suction and discharge valves in said cylinder head for admitting to said cylinder and discharging therefrom fermentation gas of the first stage of compression, a hollow annular projection extending outwardly from the lower portion of said cylinder, upright walls dividing said projection into a plurality of compartments, one of said compartments having an inlet valve and another compartment having a discharge valve for the second stage of compression of the fermentation gas, and a plurality of tubes connecting the chambers of the annular projection with said cylinder head and spaced from said cylinder, an evaporator mounted on said annular projection and surrounding said cylinder and said tubes, and a refrigeration unit for delivering liquid refrigerant to said evaporator and for removing vaporized refrigerant from said evaporator.

4. Apparatus according to claim 3 in which said hollow annular projection is divided into four chambers, one of which receives gas to be compressed for passage through some of said tubes to said cylinder head, another compartment receiving compressed gas from said cylinder head through some of said tubes for discharge to the second stage of compression, a third compartment receiving gas compressed during the second stage of compression, a tube extending from said third compartment into a fourth compartment, said tube extending through said evaporator, and a conduit for conducting compressed gas from said fourth compartment.

GRANT E. HOCKENS.

REFERENCES CITED

The following references are of record in the file of this patent:

UNITED STATES PATENTS

| Number | Name | Date |
| --- | --- | --- |
| 144,390 | Day | Nov. 11, 1873 |
| 1,443,135 | Lafferty | Jan. 23, 1923 |
| 1,478,162 | Anderson | Dec. 18, 1923 |
| 1,519,932 | Reich | Dec. 16, 1924 |
| 1,949,812 | Read | Mar. 6, 1934 |
| 1,974,791 | Belt | Sept. 25, 1934 |
| 2,160,187 | Winkler | May 30, 1939 |
| 2,362,984 | Boshkoff | Nov. 21, 1944 |